West & Plumb,
Gage Lathe.
Nº 7,095. Patented Feb. 12, 1850.
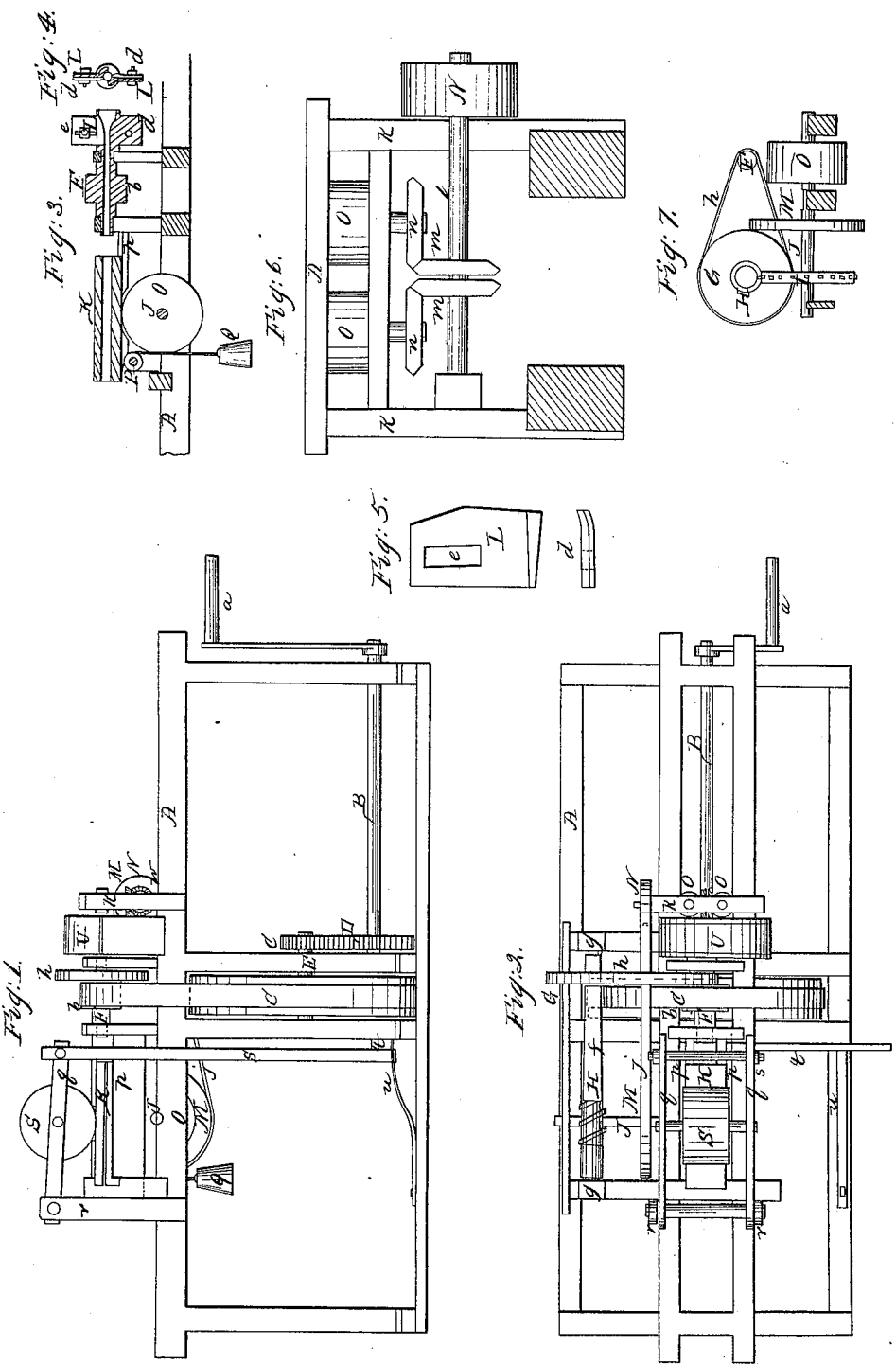

UNITED STATES PATENT OFFICE.

SOLOMON WEST AND HIRAM PLUMB, OF HONESDALE, PENNSYLVANIA.

MACHINERY FOR TURNING UMBRELLA-STICKS, &c.

Specification of Letters Patent No. 7,095, dated February 12, 1850.

*To all whom it may concern:*

Be it known that we, SOLOMON WEST and HIRAM PLUMB, of Honesdale, in the county of Wayne and State of Pennsylvania, have invented a new and useful Improvement in Machines for Turning Umbrella-Sticks, &c., which is described as follows, reference being had to the annexed drawings of the same, making part of this specification.

Figure 1, is a side elevation of the machine. Fig. 2, is a top or bird's eye view of ditto. Fig. 3, is a longitudinal section through the receiver, cutting cylinder, and other parts adjacent thereto. Fig. 4, is a cross section through the cutters. Fig. 5, are sections of the knives, and wings to which they are attached, on a larger scale than the foregoing figures. Fig. 6, is a view of the feeding rollers and frame in which they are secured. Fig. 7, is a view of the transverse shaft and its attachments.

Similar letters in the figures refer to corresponding parts.

The nature of this invention and improvement consists in introducing the stick to be cut to revolving knives or cutters, arranged at the end of a hollow shaft, and made movable so as to make them conform with any required diameter of stick, and causing the stick, after being properly turned, to be drawn through said hollow shaft by means of a receiver or carriage moving on slides and discharged at the back part of the machine, the several parts for producing these effects being operated by band, cogged, and bevel wheels secured on suitable shafts turning in boxes in the frame and put in motion by manual or other convenient power.

To enable others skilled in the art to make and use our invention, we will proceed to describe its construction and operation.

A is the frame of the machine, made of a rectangular form, of suitable size, strength, and material to contain and support the several parts of the machine.

B is a horizontal shaft, turning in suitable boxes in the lower part of the frame, having a crank (*a*) at one end by which it is turned and a cog wheel D at its opposite end, which meshes in gear with a smaller cog wheel or pinion C, on the extremity of a horizontal shaft, likewise turning in boxes in the frame, and having a large band wheel E near its opposite end.

F is a horizontal hollow shaft or cylinder turning in boxes elevated a slight distance above the top of the frame A, and having a band wheel or pulley (*b*) cast or otherwise secured on its periphery around which is passed a band (*c*) also leading around the band wheel E. This shaft or cylinder is arranged longitudinally in relation to the frame A, and is provided with wings (*d*) at one of its ends to which are secured knives or cutters L containing slots (*e*) through which are inserted screw bolts, likewise passing through openings in the wings (*d*) and having nuts on their ends, in such a manner as to allow the cutting edges of the knives or cutters L, being moved nearer to or farther from the center of the hollow shaft or cylinder F, to conform with the intended thickness of the stick to be cut, and firmly secured at the point desired on the wings. The cutting edges of the cutters or knives L are curved to correspond with the mouth of the opening in the shaft or cylinder, which is made flaring or funnel shaped.

G is a band wheel secured on a horizontal shaft (*f*) turning in uprights (*g*) near one side of the frame and above the same, around which is passed a band (*h*) leading around the hollow shaft or cylinder F. This shaft has a worm or screw H secured near its end, which meshes in gear with a cog-wheel I secured immediately above the same, to a transfer shaft J, turning in boxes on top of the frame and having a band wheel M about midway between its ends, around which is passed a band (*j*) leading around a pulley N, secured on the end of a horizontal transverse shaft (*l*) turning in boxes in a frame (*k*) rising from the main frame, immediately in advance of the cutters or knives L. Two bevel cog wheels (*m*) are secured to this shaft (*l*) which mesh in gear with similar bevel cog wheels (*n*) secured on the lower ends of upright shafts, turning in boxes in the cross beams of the frame (*k*) and having friction rollers or drums O secured to near their upper ends, by which the stuff from which the sticks are formed is fed to the knives or cutters.

K is a receiver for bearing off the sticks after being cut, composed of two oblong planks placed one above the other, grooved on their surfaces next each other so as to form when brought together, a circular opening from one end of the receiver to the other on a line with the opening in the cutter shaft or cylinder F. The under surface of the lower plank of this receiver or carriage rests on the periphery of a roller or drum (o) secured on the transverse shaft J and its edges are confined between slides (p) supported above the frame A, and rabbeted on their edges, next each other, to correspond with the edges of said lower plank.

Q is a weight suspended by a cord passing over a pulley R, turning on journals immediately under the receiver and attached to the lower part of the same, near the end farthest from the hollow shaft F.

S is a roller or drum secured on a horizontal shaft, turning in boxes in parallel bars (q) connected together at their extremities by cross bars, and connected at one of their extremities, to uprights (r) rising from the frame A, by pins upon which they move and at their opposite ends to upright bars (s) extending to the lower part of the frame, where they are secured to a horizontal transverse lever (t) extending to the outside of the machine, being secured near its outer end to a steel spring (u), secured at one end to one of the lower longitudinal timbers of the frame A, for raising the roller or drum S from the upper surface of the receiver.

U is a case surrounding the wings and knives or cutters, made stationary, and having a tangential trunk on its side so as to cause the wings and knives to act as a fan in blowing the chips or shavings from around the shaft F.

The mode of operation is as follows: Power being applied to the crank shaft B, the band wheel E, will be caused to revolve by the cog wheels C, D, which will give a revolving motion to the hollow cutter shaft or cylinder F, through the endless band (c). The stick to be turned is then introduced to the machine between the rollers or drums O, which force it into the flared end of said shaft F, between the cutters or knives L and in its gradual passage past said knives through the hollow shaft, is cut by them to the required thickness and form, the thickness being regulated by the distance the cutting edges of the knives are situated and secured by the bolts and nuts from the center of the shaft F. After the end of the stick being operated on, has passed through the shaft F it enters the opening formed between the upper and lower planks of the receiver K, sufficiently far to enable said planks, when brought together, to clamp the same, and the roller or drum S (which was previously raised from the upper surface of the receiver by the spring (u) acting on the transverse lever (t)) is brought to bear upon the receiver by the pressure of the foot of the operator on the transverse lever (t) which causes the stick to be clamped in the receiver K and the lower surface of the receiver to be borne down on the periphery of the drum or roller (o) with sufficient pressure to enable said drum or roller (which is revolved by means of the band (h) band wheel or pulley G, worm or screw H, and cog wheel I) to force the receiver from the hollow shaft F, and draw the stick entirely out of the same. The stick is then removed from between the planks of the receiver by raising the roller or drum S from contact with the same, and the receiver is drawn back to its original position by the weight Q. In this manner the operation is continued, the sticks to be turned and dressed being successively introduced between the rollers or drums O, and subjected to the process above set forth.

What we claim as our invention and desire to secure by Letters Patent is—

The combination of the hollow shaft or cylinder F graduating cutters or knives L, made and ground exactly alike, and arranged on opposite sides of said shaft or cylinder, and cutting inward and in exact unison with each other, the feeding rollers O, arranged in front, and the receiver or carriage K, arranged in the rear of the shaft F, together with the case V surrounding the cutters and wings (d) for enabling them to act as a fan or blower to discharge the shavings; the whole being arranged and operated substantially as herein set forth.

SOLOMON WEST.
HIRAM PLUMB.

Witnesses:
JAMES W. SEARS,
JOS. MCNAB.